US008996589B2

(12) United States Patent
Macchietti et al.

(10) Patent No.: US 8,996,589 B2
(45) Date of Patent: Mar. 31, 2015

(54) DIGITAL ASSET MANAGEMENT DATA MODEL

(75) Inventors: Alessandra Macchietti, Rome (IT); Karim El Haffar, Rome (IT)

(73) Assignee: Accenture Global Services Limited, Dublin (IE)

(*) Notice: Subject to any disclaimer, the term of this patent is extended or adjusted under 35 U.S.C. 154(b) by 1048 days.

(21) Appl. No.: 11/707,328

(22) Filed: Feb. 14, 2007

(65) Prior Publication Data

US 2008/0109482 A1 May 8, 2008

(30) Foreign Application Priority Data

Nov. 14, 2006 (EP) .................................... 06425776
Nov. 14, 2006 (IT) .............................. MI2006A2179

(51) Int. Cl.
*G06F 7/00* (2006.01)
*G06F 17/30* (2006.01)
(52) U.S. Cl.
CPC ................................ *G06F 17/30038* (2013.01)
USPC ...................................................... 707/804
(58) Field of Classification Search
CPC .................................................. G06F 17/3005
USPC ................................................. 707/104.1, 804
See application file for complete search history.

(56) References Cited

U.S. PATENT DOCUMENTS 7,073,193 B2 * 7/2006 Marsh ........................... 725/114
2007/0083380 A1 * 4/2007 Martinez ........................ 705/1

FOREIGN PATENT DOCUMENTS

WO WO 2006/108162 A2 10/2006

OTHER PUBLICATIONS

Peter DeVries, "Media Asset Management: Managing Complex Data as a Re-Engineering Exercise," *Data Engineering*, 1997 Proceedings 13th International Conference on Birmingham, UK, Apr. 7-11, 1997, Los Alamitos, CA, IEEE Computer Society, Apr. 7, 1997, pp. 139-148.
Ribeiro et al., "A Metadata Model for Multimedia Databases", *ICHIM01* [Online], vol. 1, Sep. 2001.
Performance Archive & Retrieval Working Group: "Current Practices in Digital Asset Management", *Internet2/CNI*, [Online], Oct. 2003.

* cited by examiner

*Primary Examiner* — Fred I Ehichioya
*Assistant Examiner* — Kris Mackes
(74) *Attorney, Agent, or Firm* — Brinks Gilson & Lione

(57) ABSTRACT

A digital asset management system effectively provides full control of compound media assets and their specific components. The digital asset management data model supports the creation and management of multiple levels of granularity or metadata enrichment, and different sets of file types or renditions used throughout the digital asset processing life-cycle. The extensible digital asset management data model allows telecommunications service providers to augment or enrich compound media asset metadata, and thereby, optimize the relationship between media assets, and enhance storage and retrieval functionalities. The digital asset management system solves the technical problems arising from ingesting, storing, and managing rich media assets economically and efficiently.

20 Claims, 8 Drawing Sheets

Prime Time News Media Asset Representation                     600

| Asset Description Object PTN | 605 |
| Channel Description Object PTN — Web | 610 |

| Movie Description Object PTN — 1 | 615 |
| Trailer Description Object PTN — 1 | 620 |
| Cover Description Object PTN — 1 | 625 |
| Audio Description Object PTN — 1 | 630 |

| Movie File Object PTN — 1 | 635 |
| Trailer File Object PTN — 1 | 640 |
| Trailer File Object PTN — 2 | 645 |
| Cover File Object PTN — 1 | 650 |
| Audio File Object PTN — 1 | 655 |

Fig. 6

DIGITAL ASSET MANAGEMENT DATA MODEL

PRIORITY CLAIM

This application claims the benefit of priority to EPO application Serial No. 06425776.9, filed on Nov. 14, 2006 and to Italian application Serial No. MI2006A002179, filed Nov. 14, 2006.

BACKGROUND OF THE INVENTION

1. Technical Field

This disclosure concerns data models and management systems for compound media assets and their specific components. In particular, this disclosure relates to a flexible and easily extensible digital asset management data model and system that uses the model to provide telecommunication service providers with the ability to efficiently acquire, catalogue, modify, store, retrieve and publish compound media assets.

2. Background Information

The ongoing dynamics within the telecommunications industry continue to create both challenges and opportunities for companies competing to identify new channels of revenue. Rapid advances in computer systems and telecommunications technologies have driven the need for methods and systems to manage an exponential demand for media content and support of a vast array of rich media services offerings. Telecommunications subscribers now receive rich media that includes any combination of audio, graphics and video data, from a wide range of sources and types (e.g., movies, news, advertisement, and sports sources). Traditional wireline or fixed services operators recognize increased competition from wireless or mobile operators resulting from the fixed-mobile substitution phenomenon or convergence of fixed-mobile service offerings. Some of the telecommunications services leveraging rich media include traditional television service, Internet service, cable television service, cellular phone service, messaging service, and combined voice and data delivery service.

The amount and types of compound media assets delivered through wireless and wireline based telecommunications devices continue to expand. For example, a movie-asset received from a content provider could be composed of a movie, several trailers, covers, digital and analogue format renditions (i.e., different file formats with accompanying rich media information), and a set of descriptive information such as intellectual property rights, pricing information, actors, writers, title, summary, description, language, dubbed languages, subtitles, and duration of each part. Hundreds of media formats exist, each with its own characteristics and proprietary format. Telecommunications service providers must integrate the rich media content, which in many cases are in disparate formats and possess other unique attributes, from various content providers and content aggregators before delivering this content to subscribers. As a result, telecommunications service providers continue to struggle to identify systems capable of efficiently and cost effectively integrating compound media assets, and managing the entire content life-cycle. In the past, no sufficiently flexible and efficient end-to-end mechanism for controlling rich media assets existed. Telecommunications service providers are now faced with difficult technical interoperability challenges related to storing, cataloguing, bundling and publishing rich media content with enriched metadata to support the content lifecycle and rapid development of new rich media service offerings.

Creating and managing various levels of granularity or metadata, and different sets of file types and formats (i.e., renditions) used throughout the digital asset processing lifecycle, and optimizing asset relationships and related search functionalities pose significant technical challenges. As one example, there is a technical challenge in defining and implementing a data model sufficiently comprehensive to eliminate inefficient methods of editing, rendering, distributing, broadcasting, publishing and creating media programming from different content providers. It is also a significant technical challenge to create a digital asset management data model which can manage unstructured compound media asset information from various content providers, and coherently model all information related to a media asset, and which has the ability to both normalize the disparate media formats into a unique flexible model, and easily incorporate new content formats. Another technical challenge lies in providing a data model which efficiently and flexibly supports metadata enrichment, and allows one to economically preserve and reuse content. Yet another technical challenge lies in providing a mechanism for efficiently cataloguing, storing and updating rich media assets, which supports higher performance during the operation and upgrade of service management logic.

A need has long existed for a flexible and easily extensible digital asset management data model and system that provide telecommunications service providers with the ability to organize and efficiently manage compound media assets. The digital asset management data model solves the technical problem of reducing the complexity of rapidly producing rich media service offerings efficiently and cost effectively.

SUMMARY

A digital asset management data model defines multiple hierarchies containing compound media asset data objects and compound media asset description objects. Selected compound media asset data objects and metadata description objects define relationships between hierarchies to form a very flexible and easily extensible model for creating and managing various levels of granularity or metadata, and different sets of file types and formats (i.e., renditions) used throughout the digital asset processing lifecycle. The compound media asset data objects and metadata description objects may be augmented or enriched with additional media asset metadata to optimize media assets relationships, enhance storage and retrieval, and easily incorporate new media content formats and new compound media asset types.

A digital asset management system which includes the data model provides the ability to efficiently acquire, catalogue, modify, store, retrieve and publish compound media assets. In one implementation, the digital asset management system includes a processor, a database implementing the digital asset management data model, communications interface and a memory. The digital asset management system provides full control of compound media assets and their specific components, and renders compound media asset renditions which the data model has been organized to support.

The processor executes a media asset acquisition program which obtains asset data and asset metadata for a media asset through a communications interface. The processor also executes an ingestion program that ingests the asset data and asset metadata by normalizing the asset data and asset metadata with respect to a defined object format. The processor populates objects within multiple hierarchies, including: the asset description objects, at least one of the compound media asset type description objects, and at least one of the compound media asset type file objects. In particular, the processor may enrich the asset metadata by augmenting the asset data and asset metadata with additional asset data and asset metadata not originally obtained for a media asset. The processor may also create different media asset formats, or perform content transcoding to produce media asset renditions suitable for transmission to specific delivery channels. The data model hierarchies provide the digital asset management system with the ability to efficiently ingest, store, and manage rich media assets, and effectively facilitate rapid development and lifecycle support of rich media service offerings.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 6 shows a media asset representation.

DETAILED DESCRIPTION

Figure 1:
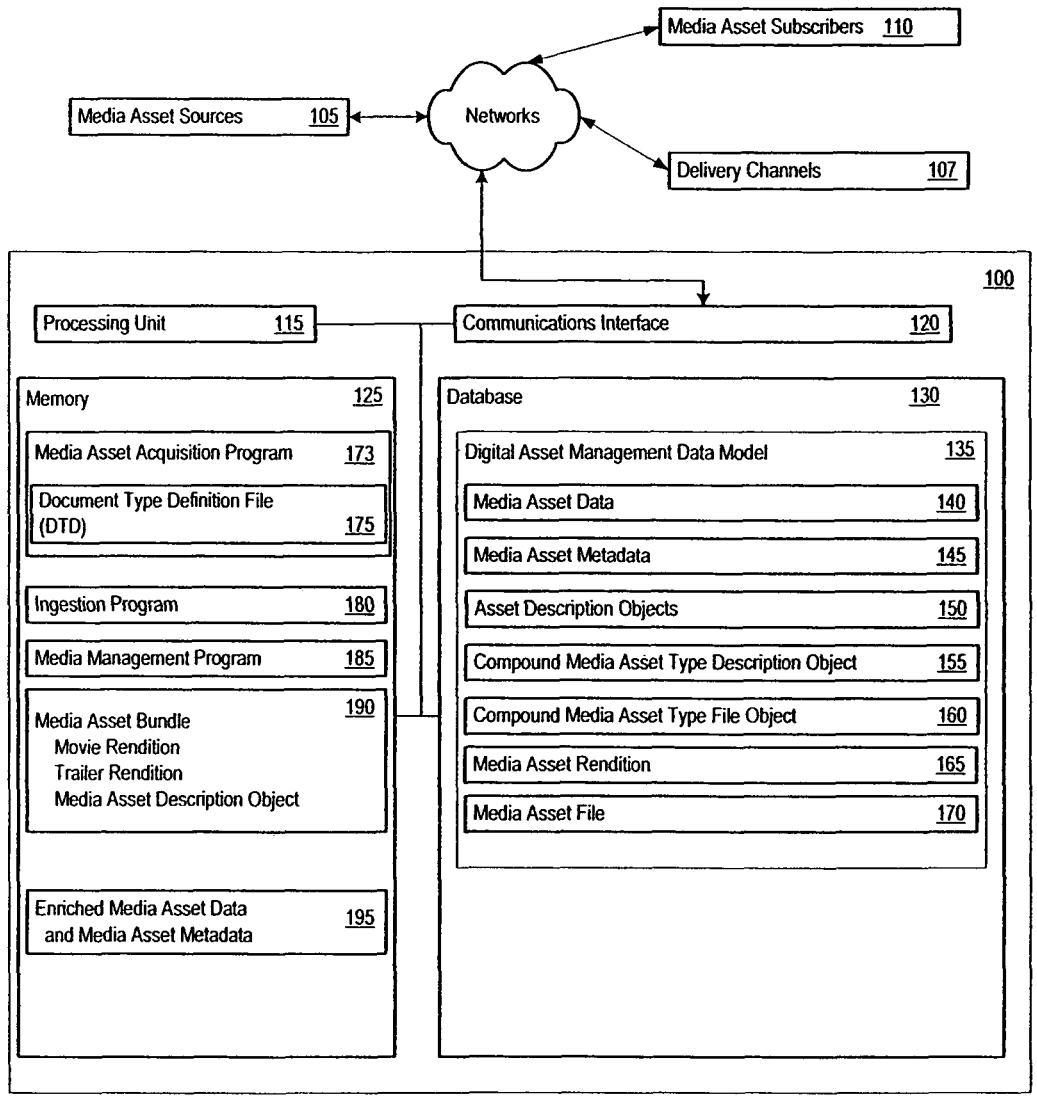
FIG. 1 illustrates a digital asset management system.

The digital asset management system addresses difficult technical interoperability challenges related to efficiently preserving and reusing compound media content from disparate content sources in terms of resource use such as processor time and memory space, as well as cost. In addition to being a comprehensive, flexible and efficient end-to-end mechanism for controlling, storing, and defining rich media content, the digital asset management system facilitates rapid creation of new media asset renditions, reduces the complexity of producing new rich media service offerings, and thereby accelerates market entry of new rich media service offerings. The digital asset management system manages unstructured compound media asset information from various sources, and coherently models all information related to a media asset by normalizing disparate media formats into a unique flexible model that easily incorporates new content formats. The digital asset management system eliminates inefficient methods of editing media data, and enriching media metadata, cataloguing, bundling, rendering, distributing, broadcasting, publishing and creating media programming. The digital asset management system creates and manages many different levels of granularity or metadata, and file types and formats (i.e., renditions) so that asset relationships and related search functionalities are optimized, and rapid development of new rich media service offerings, and higher performance during the operation and upgrade of service management logic are possible. The digital asset management system allows easy configuration of new media asset sources and new delivery channels.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations may be depicted as being stored in memories, all or part of systems and methods consistent with the digital asset management data model and system may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the digital asset management data model and system will be described, methods, systems, and articles of manufacture consistent with the digital asset management data model and system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

FIG. 1 shows a digital asset management system 100. The digital asset management system 100 includes a processing unit 115 coupled to a communication interface 120, a memory 125 and a database 130. The digital asset management system 100 organizes media asset data 140 and media asset metadata 145 received through the communication interface 120 to define relationships between multiple hierarchies, forming a very flexible and easily extensible object model identified as the digital asset management data model 135.

The communications interface 120 receives and transmits, for example, media asset data and media asset metadata, and may be directly connected to a network, such as the Internet. The communications interface 120 may include a keyboard, mouse, or any other communications interface means. The digital asset management system 100, in one implementation, is capable of communicating with media asset sources 105, delivery channels 107 and media asset subscribers 110 via the communications interface 120.

Media asset sources 105 may contract telecommunications service providers to propose, configure, provision, and enable the media assets for delivery in rich media service offerings, in return for monetary compensation. A media asset, provided by a media asset source 105, includes the content, and essence or physical representation of the data associated with the media asset. A media asset also includes information about the media asset, for example the rights related to the period of time and way an asset may be used in the delivery of rich media services to delivery channels 107 and media asset subscribers 110. A media asset is captured in the digital asset management data model 135 as media asset data 140 and media asset metadata 145.

Delivery channels 107 are venues or outlets for rich media services, which may include, for example, Internet Protocol Television (IPTV), internet websites and network television. Delivery channels 107 have platform specific format requirements for media asset renditions 165 and media asset bundles 190 derived from media assets. Telecommunication service providers receive monetary compensation from delivery channels 107 and media asset subscribers 110 for access to rich media service offerings created from the media assets.

The memory 125 stores a media asset acquisition program 173. The media asset acquisition program 173 acquires the media asset data 140 and media asset metadata 145 from the media asset sources 105 through the communications interface 120. The media asset acquisition program 173 validates the compound media asset type file object 160 against a predefined document type definition (DTD) file 175 specific to the format agreed upon by the media asset source 105. Table 1 shows an example definition of a media asset type file object, and Table 2 shows an example DTD file. The media asset acquisition program 173 validates that the metadata provided by the media asset sources 105 are semantically correct and that the mandatory fields are fulfilled and consistent.

TABLE 1

| Compound Media Asset File<br>Media Asset Source or Content Provider File |
|---|
| <?xml version="1.0" encoding="UTF-8" ?><br>- \<Asset><br>- \<AssetDescription><br>  \<Action>new\</Action><br>  \<AssetType>Movie\</AssetType><br>  \<Title>Media Asset Sources - Movie \</Title><br>  \<Description>A description of the movie. \</Description><br>  \<ProviderName>Media Asset Source\</ProviderName><br>  \<ProviderID>Media Asset Source ID \</ProviderID><br>  \<ProviderProdID>00009z\</ProviderProdID><br>  \<OriginCountry>USA\</OriginCountry><br>  \<Year>2006\</Year><br>  \<Genre>Animation\</Genre><br>  \<Rating>G - General Audience\</Rating><br>  \<IsSeries /><br>  \<EpisodeNumber /><br>  \<Protected /><br>  \<Sellable /><br>  \<EpisodeTitle /><br>  \<Actors>Actor 1 name \</Actors><br>  \<Actors>Actor 2 name \</Actors><br>  \<Actors>Actor 3 name \</Actors><br>  \<Directors>Director 1 name \</Directors><br>  \<Directors>Director 2 name \</Directors><br>  \<Directors>Director 3 name \</Directors><br>  \<Producers>Producer 1 name \</Producers><br>  \<Producers>Producer 2 name \</Producers><br>  \<Writers>Writer 1 name \</Writers><br>  \<Studio>Studio 1 name \</Studio><br>  \<Audience>Family\</Audience><br>  \<Advisory>All-Ages\</Advisory><br>  \<CreationDate /><br>  \<Summary>Movie summary.\</Summary><br> \</AssetDescription><br>- \<Channels><br>- \<Channel><br>  \<DestinationChannel>IPTV\</DestinationChannel><br>  \<StartDate>06/01/2006\</StartDate><br>  \<EndDate>06/01/2007\</EndDate><br>  \<Price>MedPC\</Price><br>  \<CostCategory>Default Cost Category\</CostCategory><br>  \<BillingID>Default Price Category\</BillingID><br>  \<NewRealaseWindow>100\</NewRealaseWindow> |

TABLE 1-continued

| Compound Media Asset File<br>Media Asset Source or Content Provider File |
|---|
|   \</Channel><br> \</Channels><br>- \<Movies><br>- \<Movie><br>  \<AspectRatio>4/3\</AspectRatio><br>  \<AudioTypes>Stereo\</AudioTypes><br>  \<AudioTypes>Dolby SR\</AudioTypes><br>  \<HDContent /><br>  \<Duration>88 min\</Duration><br>  \<Languages>English\</Languages><br>  \<SubtitleLanguages>English\</SubtitleLanguages><br>  \<SubtitleLanguages>Italian\</SubtitleLanguages><br>  \<DubbedLanguages>Italian\</DubbedLanguages><br>  \<Angles /><br>- \<Files><br>- \<File name="Filename_Movie.mpg"><br>  \<CheckSum>88\</CheckSum><br>  \<VideoBitrate>3000000\</VideoBitrate><br>  \<VideoCodec>mpeg2\</VideoCodec><br>  \<AudioCodec>mpeg1\</AudioCodec><br>  \<AudioBitrate>172000\</AudioBitrate><br>  \<FrameHeight>544\</FrameHeight><br>  \<FrameWidth>576\</FrameWidth><br> \</File><br> \</Files><br>\</Movie><br>\</Movies><br>- \<Trailers><br>- \<Trailer><br>  \<Type /><br>  \<AspectRatio>4/3\</AspectRatio><br>  \<AudioTypes>Stereo\</AudioTypes><br>  \<AudioTypes>Dolby SR\</AudioTypes><br>  \<HDContent /><br>  \<Duration>88 min\</Duration><br>  \<Languages>English\</Languages><br>  \<Languages>Italian\</Languages><br>  \<SubtitleLanguages>Italian\</SubtitleLanguages><br>  \<DubbedLanguages>Italian\</DubbedLanguages><br>  \<Angles /><br>- \<Files>/<br>- \<File name="Media_Asset_Trailer.mpg"><br>  \<CheckSum /><br>  \<VideoBitrate>3000000\</VideoBitrate><br>  \<VideoCodec>mpeg2\</VideoCodec><br>  \<AudioCodec>mpeg1\</AudioCodec><br>  \<AudioBirate>172000\</AudioBitrate><br>  \<FrameHeight>544\</FrameHeight><br>  \<FrameWidth>576\</Framewidth><br> \</File><br> \</Files><br>\</Trailer><br>\</Trailers><br>- \<Graphics><br>- \<Graphic><br>- \<Files><br>- \<File name="Media_Asset.jpg"><br>  \<AspectRatio>4:3\</AspectRatio><br>  \<DPI>96x96 \</DPI><br>  \<Width>324\</Width><br>  \<Height>475\</Height><br>  \<Format /><br>  \<CheckSum /><br> \</File><br> \</Files><br>\</Graphic><br>\</Graphics><br>\</Asset> |

TABLE 2

Document Type Definition (DTD) File

```
<?xml version="1.0" encoding="UTF-8"?>
<!ELEMENT Actors (#PCDATA)>
<!ELEMENT Advisory (#PCDATA)>
<!ELEMENT Angles (#PCDATA)>
<!ELEMENT AspectRatio (#PCDATA)>
<!ELEMENT Asset (AssetDescription, Channels, Movies?, Trailers?, Audios?,
Graphics?)>
<!ELEMENT AssetDescription (Action?, AssetType?, Title, Description?,
ProviderName?, ProviderID?, ProviderProdID, OriginCountry?, Year?, Genre?,
Rating?, IsSeries?, EpisodeNumber?, Protected?, Sellable?, EpisodeTitle?,
Actors*, Directors*, Producers*, Writers*, Studio?, Audience?, Advisory?,
CreationDate?, Summary?, SportName?, SportSeason?, SportMatchDay?,
SportTeam?, NewsDateTime?)>
<!ELEMENT AssetType (#PCDATA)>
<!ELEMENT Channels (Channel)>
<!ELEMENT Movies (Movie)>
<!ELEMENT Trailers (Trailer)>
<!ELEMENT Audios (Audio)>
<!ELEMENT Graphics (Graphic)>
<!ELEMENT Action ANY>
<!ELEMENT Audience (#PCDATA)>
<!ELEMENT Files (File)>
<!ELEMENT AudioBitrate (#PCDTA)>
<!ELEMENT AudioCodec (#PCDATA)>
<!ELEMENT AudioType (#PCDATA)>
<!ELEMENT AudioTypes (#PCDATA)>
<!ELEMENT Audio (Files)>
<!ELEMENT BillingID (#PCDATA)>
<!ELEMENT Bitrate (#PCDATA)>
<!ELEMENT Channel (DestinationChannel, StartDate, EndDate, Price?,
CostCategory?, BillingID?, NewRealaseWindow?)>
<!ELEMENT CheckSum (#PCDATA)>
<!ELEMENT Codec (#PCDATA)>
<!ELEMENT CostCategory (#PCDATA)>
<!ELEMENT CreationDate (#PCDATA)>
<!ELEMENT DPI (#PCDATA)>
<!ELEMENT Description (#PCDATA)>
<!ELEMENT DestinationChannel (#PCDATA)>
<!ELEMENT Directors (#PCDATA)>
<!ELEMENT DubbedLanguages (#PCDATA)>
<!ELEMENT Duration (#PCDATA)>
<!ELEMENT EndDate (#PCDATA)>
<!ELEMENT EpisodeNumber (#PCDATA)>
<!ELEMENT EpisodeTitle (#PCDATA)>
<!ELEMENT AudioChannels (#PCDATA)>
<!ELEMENT File (Bitrate?, Codec?, AspectRatio?, DPI?, Width?, Height?,
Format?, CheckSum?, VideoBitrate?, VideoCodec?, AudioCodec?,
AudioBitrate?, FrameHeight?, FrameWidth?, AudioChannels?)>
<!ATTLIST File
    name CDATA #REQUIRED
>
<!ELEMENT Format (#PCDATA)>
<!ELEMENT FrameHeight (#PCDATA)>
<!ELEMENT FrameWidth (#PCDATA)>
<!ELEMENT Genre (#PCDATA)>
<!ELEMENT Graphic (Files)>
<!ELEMENT HDContent (#PCDATA)>
<!ELEMENT Height (#PCDATA)>
<!ELEMENT IsSeries (#PCDATA)>
<!ELEMENT Languages (#PCDATA)>
<!ELEMENT Movie (AspectRatio?, AudioTypes*, HDContent?, Duration?,
Languages*, SubtitleLanguages*, DubbedLanguages*, Angles*, Files)>
<!ELEMENT NewRealaseWindow (#PCDATA)>
<!ELEMENT NewsDateTime (#PCDATA)>
<!ELEMENT OriginCountry (#PCDATA)>
<!ELEMENT Price (#PCDATA)>
<!ELEMENT Producers (#PCDATA)>
<!ELEMENT Protected (#PCDATA)>
<!ELEMENT ProviderID (#PCDATA)>
<!ELEMENT ProviderName (#PCDATA)>
<!ELEMENT ProviderProdID (#PCDATA)>
<!ELEMENT Rating (#PCDATA)>
<!ELEMENT Sellable (#PCDATA)>
<!ELEMENT SportMatchDay (#PCDATA)>
<!ELEMENT SportName (#PCDATA)>
<!ELEMENT SportSeason (#PCDATA)>
<!ELEMENT SportTeam (#PCDATA)>
<!ELEMENT StartDate (#PCDATA)>
```

TABLE 2-continued

Document Type Definition (DTD) File

```
<!ELEMENT Studio (#PCDATA)>
<!ELEMENT SubtitleLanguages (#PCDATA)>
<!ELEMENT Summary (#PCDATA)>
<!ELEMENT Title (#PCDATA)>
<!ELEMENT Trailer (Type, AspectRatio?, AudioTypes*, HDContent?, Duration?,
Languages*, SubtitleLanguages*, DubbedLanguages*, Angles*, Files)>
<!ELEMENT Type (#PCDATA)>
<!ELEMENT VideoBitrate (#PCDATA)>
<!ELEMENT VideoCodec (#PCDATA)>
<!ELEMENT Width (#PCDATA)>
<!ELEMENT Writers (#PCDATA)>
<!ELEMENT Year (#PCDATA)>
```

The memory 125 stores an ingestion program 180. The ingestion program 180, in one implementation, employs a two phased approach that includes normalizing and then enriching the media asset data 140 and media asset metadata 145. The ingestion program 180 processes the media asset data 140 and media asset metadata 145 received provided by media asset sources 105. The ingestion program 180 normalizes the media asset data 140 and media asset metadata 145 by populating the asset description objects 150, and some combination of the compound media asset type description objects 155 and compound media asset type file objects 160 with data and metadata conforming to the object definitions corresponding to the respective digital asset management data model 135 hierarchies.

The defined object format used by the ingestion program 180 to normalize information provided by media asset sources 105 is a unique format internal to the digital asset management data model. Media asset sources 105 provide unstructured media assets and asset information, typically in a customized or proprietary format specific to the media asset source. Normalizing media assets, in other words, populating the digital asset management data model 135 with media asset information according to the object definitions within each of the model's hierarchies, facilitates the system 100 to ingest media assets from disparate sources into a uniform, extensible, and flexible structure, and coherently model all information related to a media asset.

The processing unit 115 executes the ingestion program 180. The ingestion program 180, in one implementation, creates enriched media asset data and media asset metadata 195 by augmenting the media asset data 140 and media asset metadata 145 with additional asset data and asset metadata not originally obtained from the media asset sources 105 for the media asset. Enriching media asset metadata 145, for example, may include updating a compound media asset type description object with new languages and subtitle languages as they become available for a media asset. In an alternative implementation, enriching media asset metadata 145 includes populating a compound media asset type description object with new audio types as audio types evolve. Enriched media asset data and media asset metadata 195, in other implementations, are created by updating a compound media asset type file object with new delivery channels or target channels as they are contracted. Enriched media asset data and media asset metadata 195, in other implementations, are created by updating an asset description object with additional target audiences and genres as they are developed or identified. Enriched media asset data and media asset metadata 195 may be created, for example, by associating a media asset with a new trailer description object, and multiple trailer file objects corresponding to multiple file formats or media asset renditions.

The memory 125 may also store a media management program 185. The media management program 185, in one implementation, edits and repurposes a media asset by updating the media asset metadata 145, and creating a media asset rendition 165 from the media asset data 140 and asset media metadata 145. The media asset rendition 165 is later stored in the database 130. The media management program 185, in an alternative implementation, publishes a media asset rendition 165 of the media asset to a specific delivery channel by creating a media asset bundle 190, associating the media asset bundle 190 with a particular delivery channel 107, and scheduling and deploying the media asset bundle 190 to the delivery channel 107. A media asset bundle 190 is a subset of the asset objects created for a specific delivery channel 107, and may include an asset description object and multiple media asset renditions 165 in a format specifically for a particular delivery channel 107. In the example shown in FIG. 1, the media asset bundle 190 includes two renditions: a movie rendition; a trailer rendition; and a media asset description object associated. The system 100, in one implementation, associates a previously created media asset bundle 190 with a delivery channel 107 and corresponding delivery platform, and schedules and deploys the previously created media asset bundle 190 to the delivery channel. The system 100 may alternatively schedule and deploy to a delivery platform a previously created media asset bundle 190 previously associated with a delivery channel and delivery platform.

Figure 2:
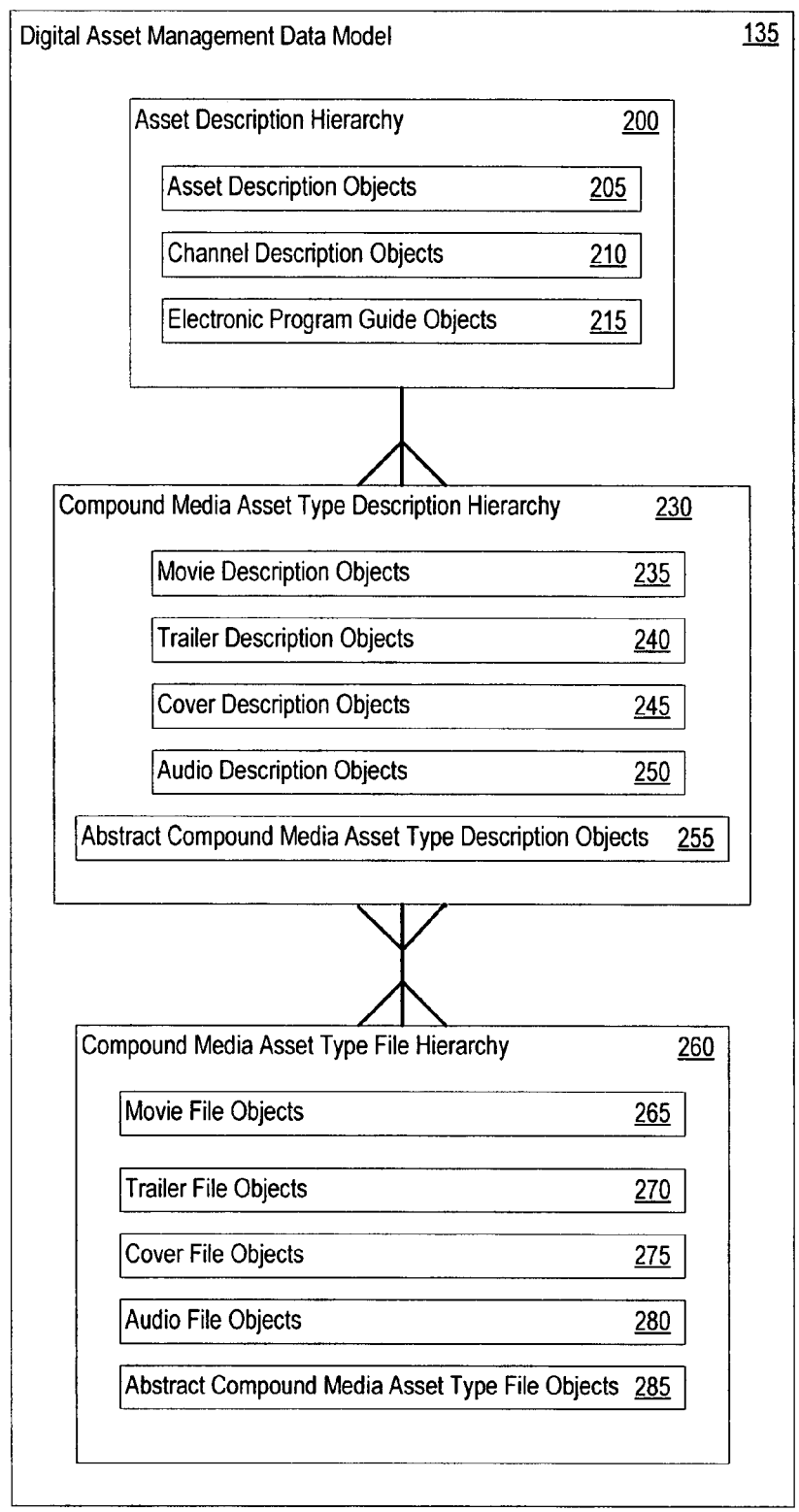
FIG. 2 shows the digital asset management data model.

FIG. 2 shows the digital asset management data model 135. The digital asset management data model 135, in the example shown in FIG. 2, may include three hierarchies, namely, the asset description hierarchy 200, compound media asset type description hierarchy 230, and the compound media asset type file description hierarchy 260. The hierarchies, logical structures or ordered levels organize the media asset data 140 and media asset metadata 145 to facilitate innovation, reduce complexity of producing new rich media service offerings, and accelerate market entry of new rich media service offerings.

The asset description hierarchy 200 associates all compound media assets and related metadata to a media asset. The compound media asset type description hierarchy 230 defines the types of compound media assets associated with a media asset. A one-to-many relationship exists between objects from the asset description hierarchy 200 and objects from the compound media asset type description hierarchy 230. The compound media asset type file description hierarchy 260 defines the files associated with compound media types associated with an asset. A many-to-many relationship exists between objects from the compound media asset type description hierarchy 230 and objects from the compound media asset type file hierarchy 260.

The asset description hierarchy 200 may include asset description objects 205. Asset description objects 205, in one implementation, include asset data and metadata as described in Table 2. Asset description objects 205 contain data and metadata relating media asset data and media asset metadata to a media asset. Asset description objects 205 relate corresponding digital asset management data model objects in the asset description hierarchy 200, compound media asset type description hierarchy 230 and compound media asset type file hierarchy 260 to a media asset.

one implementation, identify the target delivery channels of a media asset, and may include channel description asset data and metadata as described in Table 3. Channel description objects 210 contain media asset data and media asset metadata relating media asset sources 105 or content providers to delivery channels for media assets. Channel description objects 210 relate one or more delivery channels to a media asset. Accordingly, asset description objects 205 have a one-to-many relationship with corresponding channel description objects 210 for a media asset.

TABLE 2

| Asset Description Object | | | | |
|---|---|---|---|---|
| Name | Label | | | |
| Asset_description | Asset Description | | | |
| Attribute Name | Description | Attribute Type | Attribute Length | Repeating Attribute |
| Actors | Actors | String | 32 | Yes |
| Advisory | advisory | String | 32 | No |
| audience | Target Audience | String | 32 | YES |
| cp_action | Action Specified by this Asset | String | 32 | No |
| creation_date | creation_date | String | 32 | No |
| description | Description | String | 256 | No |
| directors | Directors | String | 32 | Yes |
| episode_number | Episode Number | String | 32 | No |
| episode_title | Episode Title | String | 128 | No |
| genre | Genre | String | 32 | YES |
| is_series | Is this a Series? | Boolean | 1 | No |
| news_date | Date for the news ON AIR | String | 32 | No |
| origin_country | Country of Origin | String | 32 | No |
| package_title | Title of Package | String | 256 | No |
| producers | Producers | String | 32 | No |
| production_year | Production Year | String | 4 | No |
| provider_id | Provider ID | String | 32 | No |
| provider_name | Provider Name | String | 128 | No |
| provider_prod_id | Provider Product ID | String | 32 | No |
| rating | Rating | String | 32 | No |
| sport_match_day | The day of the match | String | 32 | No |
| sport_name | Name of the sport | String | 32 | No |
| sport_season | Season of sport | String | 32 | No |
| sport_team | Team name | String | 256 | Yes |
| studio | Studio Name | String | 64 | No |
| package_summary | Summary | String | 256 | No |
| writers | Writers | String | 32 | Yes |
| cp_date_sent | Date content provider sent package | String | 32 | No |
| package_type | Package type | String | 32 | Yes |

The asset description hierarchy 200 may include channel description objects 210. Channel description objects 210, in

TABLE 3

| Channel Description Object | | | | |
|---|---|---|---|---|
| Name | Label | | | |
| channel_description | Channel Description Object Type | | | |
| Attribute Name | Attribute Label | Attribute Type | Attribute Length | Repeating Attribute |
| cost_category | Cost Category | String | 32 | No |
| destination_channel | Destination Channel | String | 32 | No |
| end_date | Licensing End Date (mm/dd/yyyy) | String | 32 | No |
| new_release_window | New Release Window | String | 32 | No |
| price | Price | String | 32 | No |

TABLE 3-continued

Channel Description Object

| price_category | Price Category | String | 32 | No |
|---|---|---|---|---|
| pub_folder_id | Publishing Source Folder Id | String | 32 | No |
| start_date | Licensing Start Date (mm/dd/yyyy) | String | 32 | No |

The asset description hierarchy 200 may include electronic program guide objects 215. Electronic program guide objects 215, in one implementation, provide information that facilitates the creation of an electronic program guide (EPG) that includes a list of current and scheduled programming available on a channel, and a short summary or commentary for each program. Electronic program guide objects 215, in an alternative implementation, contain information used to set parental controls, order programming, and search for programming based on viewer selected criteria. Electronic program guide objects 215 may include asset data and metadata as described in Table 4. Electronic program guide objects 215 contain media asset data and media asset metadata relating EPG attributes to delivery channels 107 for media assets. Electronic program guide objects 215 relate one EPG to one delivery channel for a media asset. Accordingly, asset description objects 205 have a one-to-many relationship with corresponding electronic program guide objects 215 for a media asset.

The compound media asset type description hierarchy 230 may include data and metadata describing particular compound media asset types associated with a media asset. The compound media asset type description hierarchy 230 contains compound media asset type description objects. Compound media asset type description objects may include movie description objects 235, trailer description objects 240, cover description objects 245, audio description objects 250, and abstract compound media asset type description objects 255. In other implementations, the hierarchy 230 may define additional, fewer, or different compound media asset type description objects. Compound media asset type description objects may also include asset data and metadata, such as that described in Table 5. Compound media asset type description objects define the type of media asset data associated with the media asset. For example, a media asset may be defined to include a movie, multiple trailers, a cover and several audio type description objects. Each trailer, for example, may contain media asset metadata defining distinct languages and subtitle languages associated with each trailer. Accordingly, asset description objects 205 have a one-to-many relationship

TABLE 4

Electronic Program Guide (EPG) Description Object

| Name | Label | | | |
|---|---|---|---|---|
| Electronic_program_guide_description | Electronic Program Guide Description | | | |

| Attribute Name | Attribute Label | Attribute Type | Attribute Length | Repeating Attribute |
|---|---|---|---|---|
| epg_category | EPG Category | String | 48 | No |
| epg_cp_action | Content Provider Action | String | 32 | No |
| epg_creation_date | EPG Creation Date | String | 32 | No |
| epg_description | EPG Description | String | 1024 | No |
| epg_duration | EPG Duration | String | 32 | No |
| epg_end_time | EPG End Time | String | 32 | No |
| epg_event_id | EPG Event ID | String | 32 | No |
| epg_event_type | EPG Event Type | String | 64 | No |
| epg_provider | EPG Provider | String | 128 | No |
| epg_provider_id | EPG Provider ID | String | 64 | No |
| epg_start_time | EPG Start Time | String | 32 | No |
| epg_title | EPG Title | String | 256 | No |
| epg_channel_name | Distribution Channel Name for EPG | String | 32 | No | with corresponding compound media asset type description objects 235 for a media asset.

TABLE 5

Compound Media Asset Type Description Object

| Name | Label |
|---|---|
| Compound_media_asset_type_description | compound media asset type description object |

TABLE 5-continued

Compound Media Asset Type Description Object

| Attribute Name | Attribute Label | Attribute Type | Attribute Length | Repeating Attribute |
|---|---|---|---|---|
| Compound_media_asset_type_description | Description of asset type | String | 64 | No |
| angles | Angles | String | 32 | Yes |
| aspect_ratio | Aspect Ratio | String | 64 | No |
| audio_types | Audio Types available (Dolby ProLogic, Dolby Digital, Stereo, Mono, Dolby 5.1) | String | 32 | Yes |
| dubbed_languages | Dubbed Languages | String | 32 | Yes |
| duration | duration | String | 64 | No |
| hd_content | is High Definition Content | String | 32 | No |
| languages | Languages | String | 32 | Yes |
| subtitle_languages | Subtitle Languages | String | 32 | Yes |

The compound media asset type file hierarchy 260 may include media asset data and media asset metadata associating a compound media asset type file with a media asset. The media asset. Accordingly, asset description objects 205 have a one-to-many relationship with corresponding compound media asset type file objects 260 for a media asset.

TABLE 6

Compound Media Asset Type File Object

| Name | Label |
|---|---|
| Compound_media_asset_type_file | compound media asset type file object |

Figure 3:
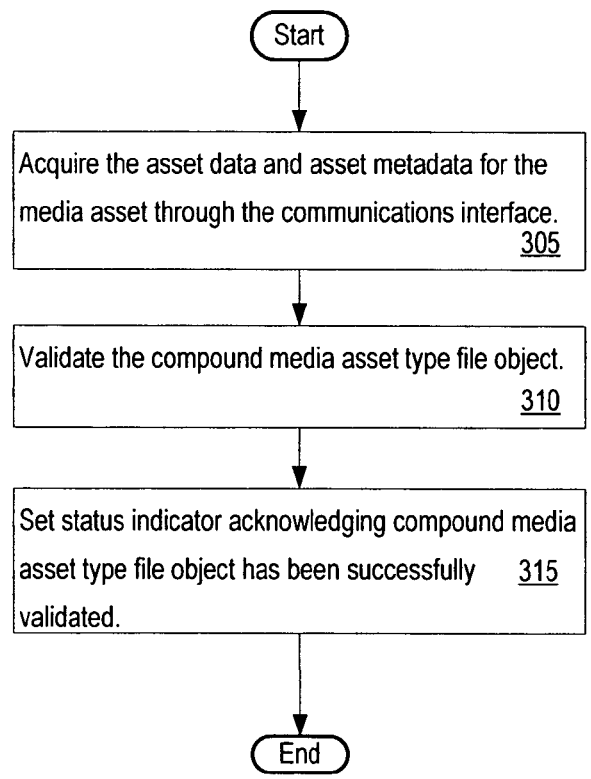
FIG. 3 shows the acts that the media acquisition program may take.

| Attribute Name | Attribute Label | Attribute Type | Attribute Length | Repeating Attribute |
|---|---|---|---|---|
| audio_bitrate | Audio Bitrate | String | 32 | No |
| audio_codec | Audio Codec | String | 32 | No |
| frame_height | Frame Height | String | 32 | No |
| frame_width | Frame Width | String | 32 | No |
| audio_channels | audio channels | String | 32 | Yes |
| target_channels | delivery channels | String | 32 | Yes |
| video_bitrate | Video Bitrate | String | 32 | No |
| video_codec | Video Codec | String | 32 | No |
| aspect_ratio | Aspect ratio | String | 32 | No |
| dpi | DPI | String | 32 | No |
| height | Height | String | 32 | No |
| width | Width | String | 32 | No |
| Is_source | Is this a source file? | Boolean | 1 | No |
| checksum | File checksum | String | 64 | No | compound media asset type file hierarchy 260, in one implementation, includes movie file objects 265, trailer file objects 270, cover file objects 275, audio file objects 280, and abstract compound media asset type file objects 285. In other implementations, the hierarchy 260 may define additional, fewer, or different compound media asset type file objects. Each media asset has at least one compound media asset type file object 160 defined, namely, the compound media asset type file object associated with the media asset source or content provider file provided by media asset sources 105, as described in Table 1. Compound media asset type file objects may also include asset data and metadata as described in Table 6. Compound media asset type file objects associate media asset data files with media assets. For example, a media asset may be associated with a movie, multiple trailers, a cover and several audio type media asset data files. Each audio file, for example, may contain distinct languages and subtitle languages data associated with each trailer. Each compound media asset type file object corresponds to at least one compound media asset type description object for a FIG. 3 shows the acts that the system 100 may take to acquire the media asset, for example by executing the media asset acquisition program 173. The media asset acquisition program 173 may acquire the media asset data 140 and media asset metadata 145 from the media asset sources 105 through the communications interface 120 (Act 305). The media asset acquisition program 173 may validate the compound media asset type file object 160 against a predefined document type definition (DTD) file 175 specific to the format agreed upon by the media asset source 105 (Act 310). The media asset acquisition program 173 validates that the metadata provided by the media asset sources 105 are semantically correct and that the mandatory fields are fulfilled and consistent. The system 100 may set a status indicator to acknowledge that the compound media asset type file object 160 has been successfully validated (Act 315).

Figure 4:
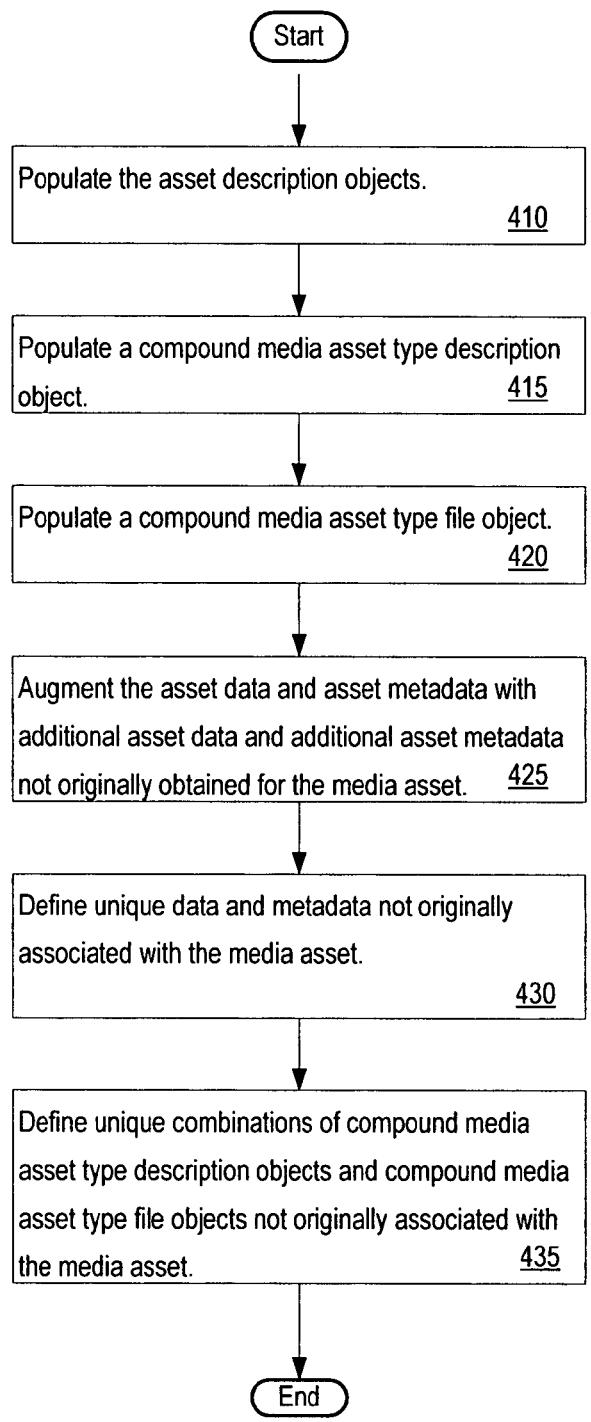
FIG. 4 shows the acts that the ingestion program may take.

FIG. 4 shows the acts that the system 100 may take to ingest a media asset, for example by executing the ingestion program 185. The system 100 may populate the asset description objects 150 with the media asset data 140 and media asset metadata 145 acquired through the communications interface 120 (Act 410). The system 100 thereby normalizes the media asset data 140 and media asset metadata 145. Normalizing media assets, in other words, populating the digital asset management data model 135 with media asset information according to the object definitions within each of the digital asset management data model's hierarchies, facilitates the system 100 to ingest media assets from disparate sources into a uniform, extensible, and flexible structure, and coherently model all information related to a media asset. The system may also populate a compound media asset type description object (Act 415), and a compound media asset type file object (Act 420). As a result, the system 100 may produce media asset renditions and media asset bundles for target delivery channels.

The system 100 may enrich the media asset metadata by augmenting the media asset data 140, and media asset metadata 145 with additional media asset data and additional media asset metadata (Act 425). The system 100, in one implementation, enriches the media asset metadata by defining unique media asset data and media asset metadata not originally associated with the media asset (Act 430). Enriching media asset metadata 145, for example, may include updating a compound media asset type description object with new languages and subtitle languages as they become available for a media asset. The system, in one implementation, further enriches the media asset metadata by defining unique combinations of compound media asset type description objects and compound media asset type file objects not originally associated with the media asset (Act 435). For example, where a channel description object, and multiple trailer description objects and corresponding trailer file objects are defined, the system 100 may define combinations of trailers and channel description objects previously not available to produce unique compound media asset combinations. In another example, as electronic smell replication technology evolves sufficiently to subsequently define a smell type description object and corresponding smell type file object for a media asset, the compound media asset objects may be combined with existing compound media asset objects to produce unique renditions.

Figure 5:
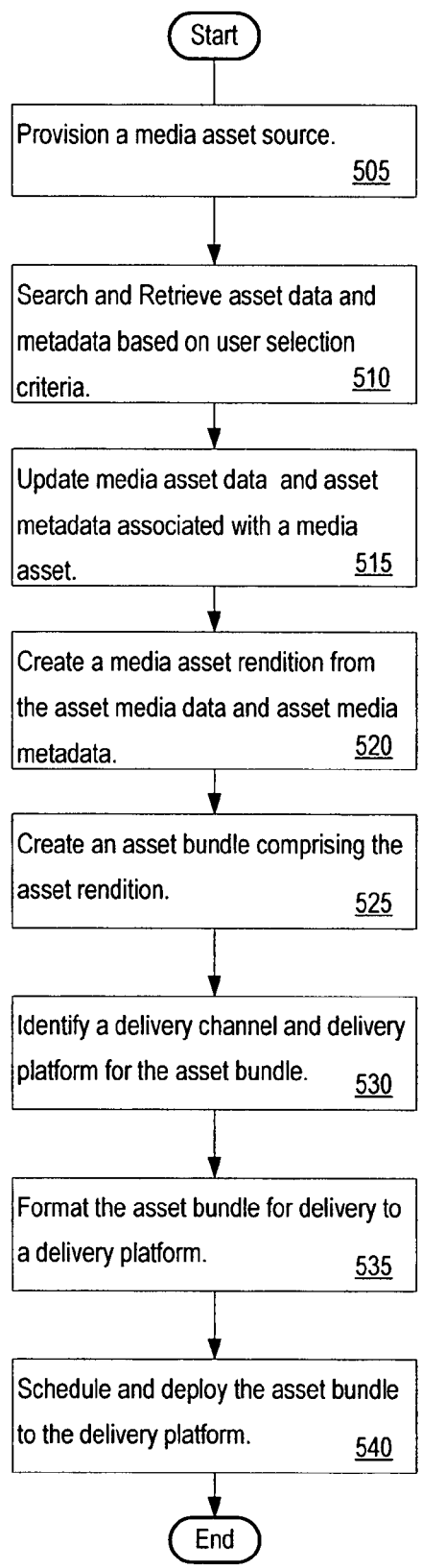
FIG. 5 shows the acts that the management program may take.

FIG. 5 shows the acts that the system 100 may take to manage a media asset, for example by executing the media management program 185. The system may provision media asset sources (Act 505). The system may search and retrieve asset data and metadata based on user selection criteria (Act 510). The system, in one implementation, edits and repurposes the media asset by updating the media asset data and media asset metadata associated with a media asset (Act 515). The system 100 may create a media asset rendition 165 from the asset media data and asset media metadata (Act 520). Creating different media asset formats or content transcoding produces media asset renditions suitable for specific delivery channels. The digital asset management data model facilitates rapid creation of new media asset renditions, reduces the complexity of producing new rich media service offerings, and thereby accelerates market entry of new rich media service offerings.

The system 100 may publish the media asset rendition 165 by creating a media asset bundle 190 with the media asset rendition 165 (Act 525), associating the media asset bundle 190 with a delivery channel 107 and corresponding delivery platform (Act 530), formatting the media asset bundle 190 for delivery to the delivery platform (Act 535), and scheduling and deploying the media asset bundle 190 to the delivery platform (Act 540). The system 100, in one implementation, associates a previously created media asset bundle 190 to a delivery channel 107 and corresponding delivery platform, and schedules and deploys the previously created media asset bundle 190 to the delivery channel. The system 100 may alternatively schedule and deploy to a delivery platform a previously created media asset bundle 190 previously associated with a delivery channel and delivery platform.

FIG. 6 illustrates a prime time news media asset representation 600. In the example shown in FIG. 6, the prime time news media asset representation 600 includes asset description objects 150 for a media asset described as Prime Time News (PTN). The asset description objects shown in FIG. 6 include an asset description object PTN (element 605), a channel description object PTN-Web (element 610). The channel description object, in FIG. 6, indicates that the representation is formatted for a website delivery channel.

The prime time news media asset representation 600, in the example shown in FIG. 6, includes a combination of compound media asset type description objects, for example, a movie description object PTN-1 (element 615), trailer description objects PTN-1 (elements 620), a cover description object PTN-1 (element 625), and an audio description object PTN-1 (element 630). The movie description object PTN-1 (element 615) may associate a main news story to the prime time news media asset. The trailer description object PTN-1 (elements 620) may associate short video clips related to the main news story. The cover description object PTN-1 (element 625) may associate a lead graphic which may be shown with the description of the asset.

The media asset representation 600, in the example shown in FIG. 6, includes a combination of compound media asset type file objects corresponding to the compound media asset type description objects, for example, a movie file object PTN-1 (element 635), trailer file objects PTN-1 and PTN-2 (elements 640 and 645), a cover file object PTN-1 (element 650), and an audio file object PTN-1 (element 655). The compound media asset type file objects associate the media asset data files to the media asset.

Figure 7:
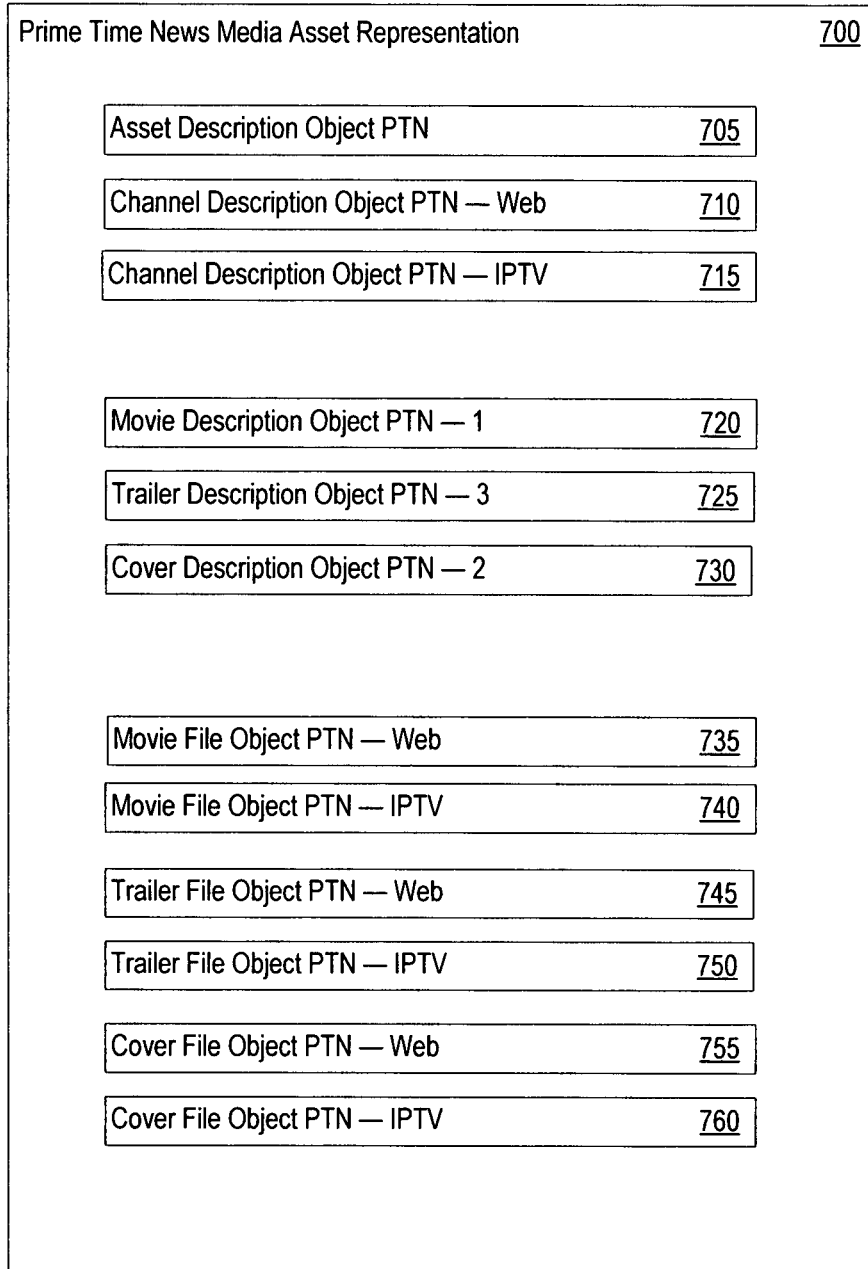
FIG. 7 shows a media asset representation.

FIG. 7 shows a second example of a prime time news media asset representation 700, Video on Demand (VoD) asset, as examples for internet protocol television (IPTV) and web delivery channels. The asset description objects shown in FIG. 7 include a channel description object PTN-Web (element 710), and a channel description object PTN-IPTV (element 715). The media asset representation 700, in the example shown in FIG. 7, also includes a combination of compound media asset type description objects, for example, a movie description object PTN-1 (element 720), trailer description objects PTN-3 (elements 725), and a cover description object PTN-2 (element 730). The trailer description object PTN-3 (elements 725) may include languages and subtitle languages that are not associated with trailer description object PTN-1 (elements 620). In the example shown in FIG. 7, where the main news story may be global in scope the trailers and covers may associate related topic content that acknowledges diplomatic protocols, and information restrictions to which the targeted delivery channel must comply. For example, supplemental or replacement commentary may be used in the trailers and cover content to the exclusion of commentary from the person on the street.

The media asset representation 700, in the example shown in FIG. 7, also includes a combination of compound media asset type file objects corresponding to the compound media asset type description objects, for example, movie file objects PTN-Web and PTN-IPTV (elements 735 and 740), trailer file object PTN-Web and PTN-IPTV (elements 745 and 750), and a cover file objects PTN-Web and PTN-IPTV (element 755 and 760).

Figure 8:
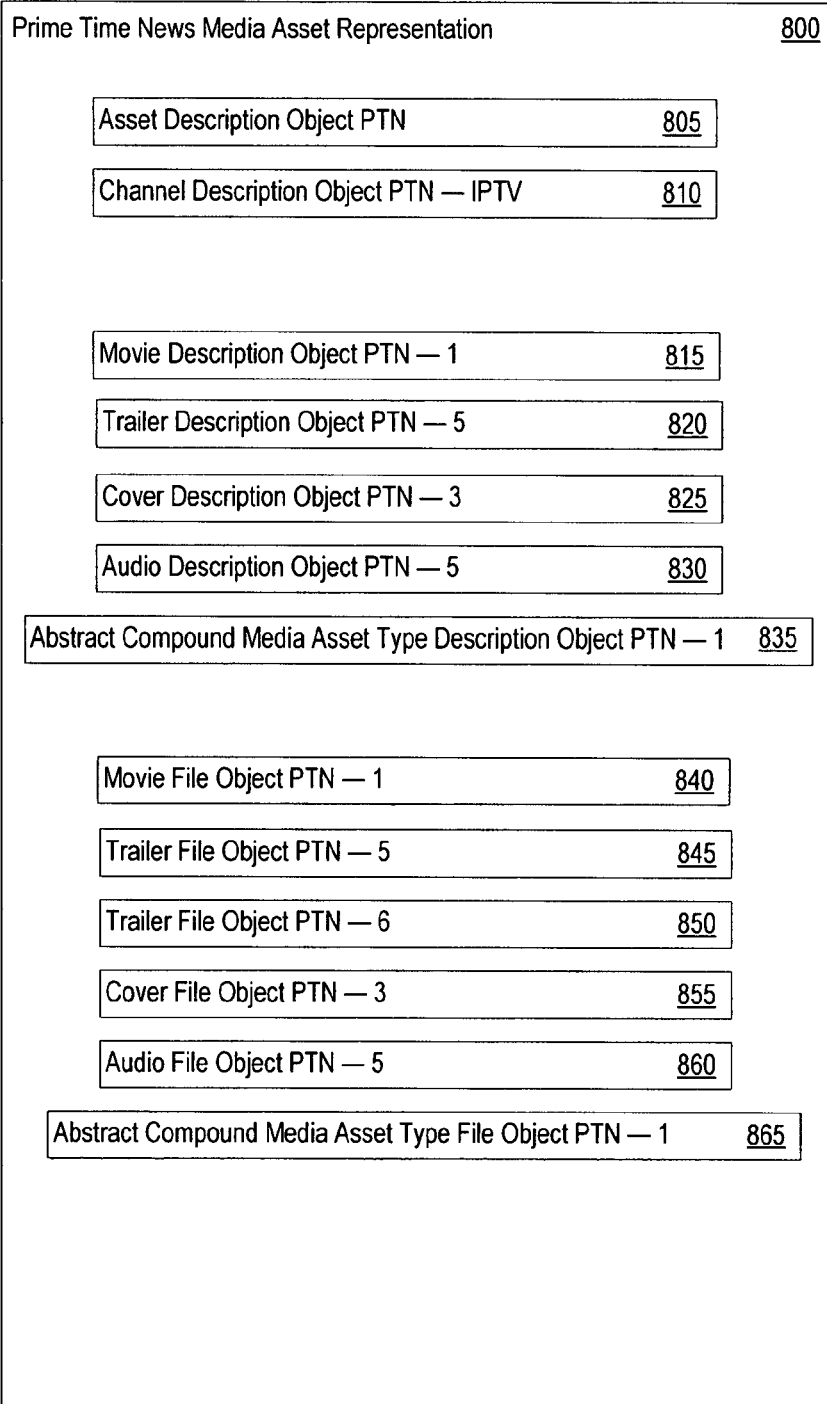
FIG. 8 shows a media asset representation.

FIG. 8 shows a prime time news media asset representation 800. The prime time news media asset representation 800, in the example shown in FIG. 8, includes a combination of compound media asset type description objects, for example, a movie description object PTN-1 (element 815), trailer description object PTN-5 (elements 820), a cover description object PTN-3 (element 825), and an audio description object PTN-5 (element 830). The compound media asset type description objects and the corresponding compound media asset type file objects, in FIG. 8, may be distinguished from the objects listed in FIGS. 6 and 7 based on any number of media asset data and media asset metadata differences. For example, the media asset representation in FIG. 8 may be distinguished from media asset representation in FIGS. 6 and 7 merely based on unique languages associated with the media asset representation in FIG. 8. The compound media asset type file objects presented in FIGS. 6, 7 and 8 are different media asset formats or renditions, produced by content transcoding.

The prime time news media asset representation 800, in the example shown in FIG. 8, includes, for example, an abstract compound media asset type description object PTN-1 (element 835), and an abstract compound media asset type file object PTN-1 (element 865) that are defined as new compound media asset type description objects and new compound media asset type file objects evolve or are recognized. For example, when telecommunications technology develops sufficiently to replicate and deliver smells as rich media content, compound media asset type description objects and corresponding compound media asset type file objects will be defined to associate various types of smell with media assets.

The system 100 is not limited to implementing the media asset representations 600, 700, or 800. Instead, the system 100 may build custom representations including any combination of compound media asset type description objects and compound media asset type file objects in combination with the asset description objects for a selected media asset. As a result, the system 100 adapts to the media content provision challenges that currently exist and that may arise in future applications.

The system 100 further provides a computer program product that includes program code, which when loaded in a computer system causes the system to perform steps according to a method as described above.

The method, system and product may be implemented in digital electronic circuitry, or in computer hardware, firmware, software, or in combinations of them. The system may alternatively be implemented as a computer program product; for example, a computer program tangibly embodied in an information carrier, such as those found in a machine-readable storage device or in a propagated signal for use by a data processing apparatus, such as a programmable processor, a computer, or even multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The method steps of one implementation may be performed by one or more programmable processors executing a computer program to perform functions of the method by operating on input data and generating output. The method steps may also be performed by, and alternative implementations of various aspects of the system 100 may be implemented as, a special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any type of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass data storage devices, such as magnetic, magneto-optical disks, or optical disks. Information carriers suitable for embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the system 100 may be implemented on a computer that has a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The system 100 may be implemented with a computing system that includes a back-end component, such as a data server, a middleware component, such as an application server, or a front-end component, such as a client computer that has a graphical user interface or a Web browser through which a user can interact with an implementation of the display apparatus, or any combination of such back-end, middleware, or front-end components. The components of the system can be interconnected by any form or medium of digital data communication, such as a communication network. Examples of communication networks include a local area network ("LAN"), a wide area network ("WAN"), and the Internet.

The computing system can include clients and servers. A client and server are generally remote from each other and typically interact through a communication network. The relationship between client and server arises by virtue of computer programs running on the respective computers and having a client-server relationship to each other.

The system 100 may include a general purpose computing device in the form of a conventional computing environment (e.g., personal computer or a laptop), including a processing unit, a system memory, and a system bus that couples various system components including the system memory to the processing unit. The processing unit may perform arithmetic, logic, and control operations by accessing system memory. The system memory may store information and instructions for use in combination with the processing unit. The system memory may include volatile and non-volatile memory, such as random access memory (RAM) and read only memory (ROM). A basic input/output system (BIOS) containing the basic routines that help transfer information between elements within the personal computer, such as during start-up, may be stored in ROM. The system bus may be any of several types of bus structures including a memory bus or memory controller, a peripheral bus, and a local bus using any of a variety of bus architectures.

The personal computer may further include a hard disk drive for reading from and writing to a hard disk, and an external disk drive for reading from or writing to a removable disk. The removable disk may be a magnetic disk for a magnetic disk driver or an optical disk such as a CD ROM for an optical disk drive. The hard disk drive and external disk drive are connected to the system bus by a hard disk drive interface and an external disk drive interface, respectively. The drives and their associated computer-readable media provide nonvolatile storage of computer readable instructions, data structures, program modules and other data for the personal computer. The data structures may include relevant data regarding the implementation of the visualization method, as described above, and in particular, data for defining the assignment of applications to the processes performed in connection with the products. The relevant data may be organized in a database, for example in a relational or object database.

Although the computing environment presently described employs a hard disk and an external disk, it should be appreciated by those skilled in the art that other types of computer readable media which can store data accessible by a computer, such as magnetic cassettes, flash memory cards, digital video disks, random access memories, read only memories, and the like, may also be used in the exemplary operating environment.

A number of program modules may be stored on the hard disk, external disk, ROM or RAM, including an operating system, one or more application programs, other program modules, and program data. The application programs may include at least a part of the functionality as indicated in FIGS. 1 through 8.

A user may enter commands and information, as discussed above, into the personal computer through input devices such as a keyboard and mouse. Other input devices may include a microphone (or other sensors), joystick, game pad, scanner, or the like. These and other input devices may be connected to the processing unit through a serial port interface that is coupled to the system bus, or may be collected by other interfaces, such as a parallel port interface, game port, or a universal serial bus (USB). Further, information may be printed using a printer. The printer, and other parallel input/output devices, may be connected to the processing unit through parallel port interface. A monitor or other type of display device is also connected to the system bus via an interface, such as a video input/output. In addition to the monitor, a computing environment may include other peripheral output devices, such as speakers or other audible output.

The computing environment may communicate with other electronic devices, wired or wireless, such as a computer, telephone, personal digital assistant, television, or the like. To communicate, the computer environment may operate in a networked environment using connections to one or more electronic devices. The computer environment may also be networked with a remote computer. The remote computer may be another computing environment such as a server, a router, a network PC, a peer device, or other common network node, and may include many or all of the elements described above relative to the computing environment. The logical connections may include a local area network (LAN) and a wide area network (WAN). Such networking environments are commonplace in offices, enterprise-wide computer networks, intranets and the Internet.

The network connections shown are examples only, and other logic for establishing a communications link between the electronic devices may be used.

The above-described computing system is only one example of the type of computing system that may be used to implement the system 100.

A number of implementations have been described. Nevertheless, it will be understood that various modifications may be made without departing from the spirit and scope of the invention. Accordingly, other implementations are within the scope of the following claims.

The invention claimed is:

1. A digital asset management system for controlling compound media assets comprising:
   a communication interface;
   a digital asset management database comprising a data model with three related hierarchies that together organize all media asset data and media asset metadata of a specified media asset that includes one or more media asset types and one or more delivery destinations, prior to controlling delivery of the specified media asset, wherein the three hierarchies of the data model include:
      an asset description hierarchy comprising asset description objects for all media assets of the specified media asset including asset package information associated with the specified media asset, wherein the asset description objects are populated with attributes that include media asset data, media asset metadata, enriched media asset data, and enriched media asset metadata of the specified media asset;
      a compound media asset type description hierarchy that defines the types of media assets associated with the specified media asset and are described in the asset description hierarchy, wherein said compound media asset type description hierarchy comprises compound media asset type description objects wherein each compound media asset type description object:
         defines a different type of media asset that is associated with the specified media asset; and
         includes attributes of the defined media asset type including one or both of media asset data and media asset metadata attributes that associate the defined media asset type to the specified media asset;
      a compound media asset type file hierarchy for the specified media asset comprising compound media asset type file objects wherein each compound media asset type file object is associated with a media asset source or content provider and each compound media asset type file object corresponds to at least one of the objects in the compound media asset type description hierarchy, said compound media asset type file objects comprising:
         media asset data attributes and media asset metadata attributes that associate a media asset data file to one of the compound media asset types; and
         media asset files comprising physical data representations of renderings associated with the compound media types;
   a memory comprising:
      an ingestion program for creating the three hierarchies of the data model for the specified media asset, which is operable to:
         obtain source media asset data and source media asset metadata asset through the communication interface;
         ingest the source media asset data and the source media asset metadata by:

normalizing the source media asset data and source media asset metadata with respect to a defined object format by populating, based on the source media asset data and the source media asset meta data:
the media asset description objects;
at least one of the compound media asset type description objects; and
at least one of the compound media asset type file objects; and
subsequently obtain additional source media asset data and additional source media asset metadata through the communication interface for the specified media asset, when it becomes available from a source;
create said enriched media asset data and said enriched media asset metadata by:
updating at least one of said compound media asset type description objects with new attributes based on the additional source media asset data and the additional source media asset metadata, and
updating at least one of said compound media asset type file objects based on the additional source media asset data or the additional source media asset meta data; or
defining a new type of compound media asset type description object and one or more corresponding new types of compound media asset file objects for the specified media asset in instances when the additional source media asset data or additional source media asset metadata is based on a newly evolved technology; and
a processor coupled to the communication interface, database and the memory, and operable to execute the ingestion program.

2. The digital asset management system of claim 1, where the additional media asset data, the media additional media asset metadata, or both comprise a diplomatic protocol establishing an information restriction to which a targeted delivery channel for the media asset data, the additional media asset metadata, or both must comply, where the information restriction comprises replacement commentary.

3. The digital asset management system of claim 1, where the asset description hierarchy comprises:
a media asset package description object comprising media asset data and media asset metadata;
a channel description object comprising asset source information;
an electronic program guide object comprising enhanced functionality metadata; and
an exceptions object comprising asset metadata exceptions identified while ingesting, storing and managing the asset.

4. The digital asset management system of claim 1, where the compound media asset type description hierarchy comprises:
a movie description object comprising metadata relating a movie to the specified media asset;
a trailer description object comprising metadata relating a trailer to the specified media asset;
a cover description object comprising metadata relating a cover to the specified media asset;
an audio description object comprising metadata relating audio to the specified media asset; and
an abstract compound media asset type object comprising metadata relating other compound media asset types to the specified media asset.

5. The digital asset management system of claim 1, where the compound media asset type file hierarchy comprises:
a movie file object comprising:
metadata defining a movie file associated with the specified media asset, the movie file comprising a physical data representation of a rendering associated with the specified media asset;
a trailer file object comprising:
metadata defining a trailer file associated with the specified media asset, the trailer file comprising a physical data representation of a rendering associated with the specified media asset;
a cover file object comprising:
metadata defining a cover file associated with the specified media asset, the cover file comprising the physical data representation of a rendering associated with the specified media asset; and
an audio file object comprising:
metadata defining a audio file associated with the specified media asset, the audio file comprising the physical data representation of a rendering associated with the specified media asset.

6. The digital asset management system of claim 1, where the compound media asset type file hierarchy comprises:
an abstract compound media asset type file object for new types of media assets comprising:
metadata defining other file types associated with the specified media asset, the abstract file-type file comprising the physical data representation of a rendering associated with the specified media asset.

7. The digital asset management system of claim 1, where the memory further comprises a media management program operable to:
edit and repurpose the specified media asset by:
updating the media asset data and the media asset metadata of the specified media asset; and
creating an asset rendition from the updated media asset data and the updated media asset metadata;
publish an asset rendition of the specified media asset by:
creating an asset bundle comprising the asset rendition, wherein an asset bundle comprises a subset of objects from the specified media asset created for a specific delivery channel;
associating the asset bundle with a delivery channel by:
identifying a delivery channel and delivery platform; and
formatting the asset bundle for delivery to a delivery platform; and
scheduling and deploying the asset bundle to the specific delivery platform, and where:
the processor is operable to execute the media management program.

8. The digital asset management system of claim 7, where the media management program is further operable to:
search the digital asset management database, and retrieve media asset data and media asset metadata based on user selection criteria; and
administer the digital asset management system by provisioning a media asset source, and where:
the processor is operable to execute the media management program.

9. The digital asset management system of claim 1, where the ingestion program is further operable to enrich the asset metadata by:

defining unique media asset data and media asset metadata not originally associated with the specified media asset; and defining unique combinations of compound media asset type description objects and compound media asset type file objects not originally associated with the specified media asset.

10. The digital asset management system of claim 1, where the memory further comprises search, storage, and retrieval optimized combinations of compound media asset type description objects and compound media asset type file objects.

11. A computer implemented method of ingesting a media asset for controlling compound media assets, the method comprising:

defining a digital asset management database that includes a data model with three related hierarchies that together organize all media asset data and media asset metadata of a specified media asset that includes one or more media asset types and one or more delivery destinations, prior to controlling delivery of the specified media asset, comprising:

defining an asset description hierarchy comprising asset description objects for all media assets of the specified media asset including asset package information associated with the specified media asset, wherein the asset description objects are populated with attributes that include media asset data, asset metadata media, unique media asset data and unique media asset metadata of the specified media asset, defining a compound media asset type description hierarchy that defines types of media assets associated with the specified media asset and are described in the asset description hierarchy, wherein said compound media asset type description hierarchy comprises compound media asset type description objects wherein each compound media asset type description object:

defines a different type of media asset that is associated with the specified media asset; and includes attributes of the defined media asset type including one or both of media asset data and media asset metadata attributes that associate the defined media asset type to the specified media asset;

defining a compound media asset type file hierarchy for the specified media asset comprising compound media asset type file objects wherein each compound media asset type file object is associated with a media asset source or content provider and each compound media asset type file object corresponds to at least one of the objects in the compound media asset type description hierarchy, said compound media asset type file objects comprising:

media asset data attributes and media asset metadata attributes that associate a media asset data file to one of the compound media types; and media asset files comprising physical data representations of renderings associated with compound media types;

obtaining source media asset data and source media asset metadata for creating the three hierarchies of the data model for the specified media asset through the communication interface;

ingesting the source media asset data and the source media asset metadata by:

normalizing the source media asset data and source media asset metadata with respect to a defined object format by populating, based on the source media asset data and source media asset meta data:

the media asset description objects;

at least one of the compound media asset type description objects; and at least one of the compound media asset type file objects; and subsequently obtaining additional source media asset data and additional source media asset metadata through the communication interface for the specified media asset, when it becomes available from a source;

creating said unique media asset data and said unique media asset metadata by:

updating at least one of said compound media asset type description objects with new attributes, updating at least one of said compound media asset type file objects based on the additional source media asset data or the additional source media asset meta data; or defining a new type of compound media asset type description object and one or more corresponding new types of compound media asset file objects for the specified media asset in instances when the additional source media asset data or the additional source media asset metadata is based on a newly evolved technology; and defining unique combinations of compound media asset type description objects and unique compound media asset type file objects not originally associated with the specified media asset; and repurposing the specified media asset by:

updating the media asset data and the media asset metadata of the specified media asset with the unique media asset data and the unique media asset metadata; and creating an asset rendition from the updated media asset data and the updated media asset metadata;

publishing an asset rendition of the specified media asset by:

creating an asset bundle comprising the asset rendition;

associating the asset bundle with a delivery channel by:

identifying a delivery channel and delivery platform; and formatting the asset bundle for delivery to a delivery platform; and scheduling and deploying the asset bundle to the delivery platform; and searching the digital asset management database, and retrieving media asset data and media asset metadata based on user selection criteria; and provisioning a media asset source.

12. The method according to claim 11, where the unique media asset data, the unique media asset metadata, or both comprise a diplomatic protocol establishing an information restriction to which a targeted delivery channel for the unique media asset data, the unique media asset metadata, or both must comply, where the information restriction comprises replacement commentary.

13. The method according to claim 11, where defining an asset description hierarchy comprises:

establishing a media asset package description object comprising media asset data and media asset metadata;

establishing a channel description object comprising asset source information;

establishing an electronic program guide object comprising enhanced functionality metadata; and establishing an exceptions object comprising asset metadata exceptions identified while acquiring, ingesting, storing, publishing and managing the specified media asset.

14. The method according to claim 11, where defining a compound media asset type description hierarchy comprises:
   establishing a movie description object comprising metadata relating a movie to the specified media asset;
   establishing a trailer description object comprising metadata relating a trailer to the specified media asset;
   establishing a cover description object comprising metadata relating a cover to the specified media asset;
   establishing an audio description object comprising metadata relating audio to the specified media asset; and
   establishing an abstract compound media asset type object comprising metadata relating new compound media asset types to the specified media asset.

15. The method according to claim 11, where defining a compound media asset type file hierarchy comprises:
   establishing a movie file object comprising:
      metadata defining a movie file associated with the specified media asset, the movie file comprising a physical data representation of a rendering associated with the specified media asset;
   establishing a trailer file object comprising:
      metadata defining a trailer file associated with the specified media asset, the trailer file comprising a physical data representation of a rendering associated with the specified media asset;
   establishing a cover file object comprising:
      metadata defining a cover file associated with the specified media asset, the cover file comprising the physical data representation of a rendering associated with the specified media asset;
   establishing an audio file object comprising:
      metadata defining a audio file associated with the specified media asset, the audio file comprising the physical data representation of a rendering associated with the specified media asset; and
   establishing an abstract compound media asset type file object comprising:
      metadata defining other file types associated with the specified media asset, the abstract file-type file comprising the physical data representation of a rendering associated with the specified media asset.

16. A product for controlling compound media assets comprising:
   a non-transitory computer readable memory comprising processor executable instructions encoded on the non-transitory medium which cause a data processing system to perform a method comprising:
   defining a digital asset management database that includes a data model with three related hierarchies that together organize all media asset data and media asset metadata of a specified media asset that includes one or more media asset types and one or more delivery destinations, prior to controlling delivery of the specified media asset, comprising:
      defining an asset description hierarchy comprising asset description objects for all media assets of the specified media asset including asset package information associated with the specified media asset, wherein the asset description objects are populated with attributes that include media asset data, media asset metadata, unique media asset data and unique media asset metadata of the specified media asset;
      defining a compound media asset type description hierarchy that defines types of media assets associated with the specified media asset and are described in the asset description hierarchy, wherein said compound media asset type description hierarchy comprises compound media asset type description objects wherein each compound media asset type description object:
         defines a different type of media asset that is associated with the specified media asset; and
         includes attributes of the defined media asset type including one or both of media asset data and media asset metadata attributes that associate the defined media asset type to the specified media asset;
      defining a compound media asset type file hierarchy for the specified media asset comprising compound media asset type file objects wherein each compound media asset type file object is associated with a media asset source or content provider and each compound media asset type file object corresponds to at least one of the objects in the compound media asset type description hierarchy, said compound media asset type file objects comprising:
         media asset data attributes and media asset metadata attributes that associate a media asset data file to one of the compound media types; and
         media asset files comprising physical data representations of renderings associated with compound media types;
   performing for a selected media asset comprising the specified media asset the following steps:
      obtaining source media asset data and source media asset metadata for creating the three hierarchies of the data model for the specified media asset through a communication interface;
      ingesting the source media asset data and the source media asset metadata by:
         normalizing the source media asset data and source media asset metadata with respect to a defined object format by populating, based on the source media asset data and source media asset meta data:
            the media asset description objects;
            at least one of the compound media asset type description objects; and
            at least one of the compound media asset type file objects; and
         subsequently obtain additional source media asset data and additional source media asset metadata through the communication interface for the specified media asset, when it becomes available from a source;
      create said unique media asset data and said unique media asset metadata by:
         updating at least one of said compound media asset type description objects with new attributes,
         updating at least one of said compound media asset type file objects base on the additional source media asset data or the additional source media asset meta data; or
         defining a new type of compound media asset type description object and one or more corresponding new types of compound media asset file objects for the specified media asset in instances when the additional source media asset data or the additional source media asset metadata is based on a newly evolved technology; and defining unique combinations of compound media asset type description objects and compound media asset type file objects not originally associated with the specified media asset; and repurposing the specified media asset by:
- updating the media asset data and the media asset metadata of the specified media asset with the unique media asset data and the unique media asset metadata; and
- creating an asset rendition from the updated media asset data and the updated media asset metadata;

publishing an asset rendition of the specified media asset by:
- creating an asset bundle comprising the asset rendition;
- associating the asset bundle with a delivery channel by:
  - identifying a delivery channel and delivery platform; and
  - formatting the asset bundle for delivery to a delivery platform; and
- scheduling and deploying the asset bundle to the delivery platform; and searching the digital asset management database, and retrieving media asset data and media asset metadata based on user selection criteria; and provisioning a media asset source.

17. The product of claim 16, where the unique media asset data, the unique media asset metadata, or both comprise a diplomatic protocol establishing an information restriction to which a targeted delivery channel for the unique media asset data, the unique media asset metadata, or both must comply, where the information restriction comprises replacement commentary.

18. The product of claim 16, where defining an asset description hierarchy comprises:
- establishing a media asset package description object comprising media asset data and media asset metadata;
- establishing a channel description object comprising asset source information;
- establishing an electronic program guide object comprising enhanced functionality metadata; and
- establishing an exceptions object comprising asset metadata exceptions identified while acquiring, ingesting, storing, publishing and managing.

19. The product of claim 16, where defining a compound media asset type description hierarchy comprises:
- establishing a movie description object comprising metadata relating a movie to the specified asset;
- establishing a trailer description object comprising metadata relating a trailer to the specified asset;
- establishing a cover description object comprising metadata relating a cover to the specified asset;
- establishing an audio description object comprising metadata relating audio to the specified asset; and
- establishing an abstract compound media asset type object comprising metadata relating other compound media asset types to the specified asset.

20. The product of claim 16, where defining a compound media asset type file hierarchy comprises:
- establishing a movie file object comprising:
  - metadata defining a movie file associated with the specified media asset, the movie file comprising a physical data representation of a rendering associated with the specified media asset;
- establishing a trailer file object comprising:
  - metadata defining a trailer file associated with a media asset, the trailer file comprising a physical data representation of a rendering associated with the specified media asset;
- establishing a cover file object comprising:
  - metadata defining a cover file associated with the specified media asset, the cover file comprising the physical data representation of a rendering associated with the specified media asset;
- establishing an audio file object comprising:
  - metadata defining an audio file associated with the specified media asset, the audio file comprising the physical data representation of a rendering associated with the specified media asset; and
- establishing an abstract compound media asset type file object comprising:
  - metadata defining other file types associated with the specified media asset, the abstract file-type file comprising the physical data representation of a rendering associated with the specified media asset.

* * * * *